Patented Feb. 14, 1950

2,497,447

UNITED STATES PATENT OFFICE 2,497,447

SILICA SOL CATALYST IN THE EMULSION POLYMERIZATION OF BUTADIENE-1,3 HYDROCARBONS

Alfred J. Green, Waterbury, Conn., assignor to United States Rubber Company, New York, N. Y., a corporation of New Jersey No Drawing. Application January 11, 1945, Serial No. 572,426

8 Claims. (Cl. 260—83.7)

This invention relates to improvements in the emulsion polymerization of butadiene-1,3 hydrocarbons and mixtures of butadiene-1,3 hydrocarbons with compounds which are copolymerizable therewith.

A primary object of the invention is to provide means for securing increased yields of high quality synthetic rubber-like material at relatively low temperatures and in a relatively short period of time from the emulsion polymerization of butadiene-1,3 hydrocarbons and from the emulsion copolymerization of butadiene-1,3 hydrocarbons and materials such as styrene and acrylonitrile which are copolymerizable with such butadiene-1,3 hydrocarbons. Other objects will be apparent from the following description.

The emulsion polymerization of butadiene-1,3 hydrocarbons and emulsion copolymerization of butadiene-1,3 hydrocarbons with copolymerizable material, such as styrene and acrylonitrile, in the presence of an oxidizing catalyst, such as alkali metal perborate, alkali metal persulphate, hydrogen peroxide, benzoyl peroxide or the like, together with a mercaptan regulator such as an aliphatic mercaptan having 6 to 18 carbon atoms, or an aromatic mercaptan, is known.

I have discovered that hydrous silicia sol is effective as a polymerization catalyst in the emulsion of butadiene-1,3 hydrocarbons and the emulsion copolymerization of butadiene-1,3 hydrocarbons with materials which are copolymerizable therewith. The polymerization with the hyrous silica sol catalyst may take place in the absence of previously known oxidizing catalysts such as above referred, or in the absence of free oxygen other than in the air that is dissolved in the water phase of the emulsion or is normally present as a gas in the reaction chamber at the beginning of the polymerization. Such previously known oxidizing catalysts may, however, be present, if desired. As is known, hydrous silica sol may be prepared by mixing together dilute solutions of sodium silicate and an acid. The emulsion polymerization should take place in a non-alkaline medium, preferably at a pH below 7, i. e., on the acid side, in order to prevent redissolution of the hydrous silica sol since it does not appear that silicate ions will act as a catalyzer similar to the hydrous silica sol. The emulsion of the monomeric materials should, of course, contain a dispersing or protective agent which is effective on the acid side, such as the well known cationic salts, for example, dodecylammonium acetate, lauryltrimethyl ammonium bromide, trimethylcetyl ammonium iodide, laurylpyridinium chloride, lauryldimethylbenzyl ammonium chloride, cetyldimethylbenzyl ammonium chloride, N-laurylbetain. Such cationic salts may also be used to acidify the emulsion. Other protective or stabilizing agents are the well known surface active agents of the type R—SO$_3$—M, where M may be an alkali metal hydrogen or ammonium radical, and the R represents an organic radical containing at least one group containing more than 8 carbon atoms, for example, where R is an alkoxy group, an alkyl group, a mixed ether of long and short chain aliphatic groups, an alkyl ester of a long chain fatty alcohol, a glycol ester of a long chain fatty alcohol, an alkyl substituted amid of a fatty acid, an alkyl substituted aromatic radical, a hydroaromatic radical, or an ester of a dibasic acid. Other commercial protectives that may be used are the reaction products of ethylene oxide and higher alcohols.

The polymerizable material may be a butadiene-1,3 hydrocarbon, for example, butadiene-1,3, 2-methyl butadiene-1,3 (isoprene), 2,3-dimethyl butadiene-1,3 piperylene. The additional materials which may be present and which are copolymerizable with such butadiene-1,3 hydrocarbons are compounds which have a single C=C double linkage, for example, esters of maleic and fumaric acids and compounds which contain $CH_2=C<$ group where at least one of the disconnected valences is attached to an electro-active group, that is, a group which substantially increases the electrical dissymmetry or polar character of the molecule. Examples of compounds which contain a $CH_2=C<$ group and are copolymerizable with butadiene-1,3 hydrocarbons are aryl olefines, such as styrene and vinyl naphthylene, the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

The amount of hydrous silica sol catalyst used is not critical. Small amounts, generally from .2 to 2 parts of hydrous silica sol calculated as dry weight, per 100 parts of polymerizable material are generally sufficient. The time and temperature of the polymerization reaction should naturally be adequate to accomplish the desired polymerization. It is known that a ten degree centigrade increase in the temperature of polymerization will cut the time necessary for the same degree of polymerization about in half. At a temperature of 20° C. to 60° C., the time necessary for polymerization may be from 100 to 10 hours. The polymerization with hydrous silica sol as shown in the example below is about twice as fast as the conventional polymerization of the same polymerizable materials in a soap protected emulsion using potassium persulfate catalyst.

The following is given in illustration of the invention, the parts referred to therein being by weight:

To 15 parts of a 1 per cent hydrochloric acid solution 19 parts of a 3 per cent aqueous solution of sodium silicate was added with rapid stirring, whereupon a colloidal hydrous silica sol was formed, the pH being 2.3. To this was added 262 parts of water and 74 parts of a 11 per cent aqueous solution of dodecylammonium chloride at a pH of 2.1 to give a pH of the mixture of 2.0. To this solution was added 45 parts of styrene containing 1 part of conventional dodecyl mercaptan regulator and then 135 parts of butadiene-1,3 was added. The mixture was agitated to emulsify the styrene and butadiene and the aqueous emulsion was gently agitated and heated for 15 hours at 40° C. At the end of this polymerization, there was added .3 part of hydroquinone (a conventional reaction stopper) per 100 parts of polymerizable material originally present in the emulsion. The unreacted butadiene monomer was vented off, followed by steam distillation to remove the unreacted styrene monomer. The polymer conversion, that is, the percentage of butadiene and styrene which combined to form a polymer and remain in the synthetic rubber latex, was 72%, and the pH of the recovered latex was 2.4. A similar polymerization for 15 hours at 40° C. without the addition of the hydrous silica sol but with the pH of the original emulsion adjusted to 2.0, gave a polymer conversion of only 40%, the pH of the final latex being 2.5.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The process which comprises polymerizing in an aqueous emulsion at a pH from 2 to below 7 material selected from the group consisting of butadiene-1,3 hydrocarbons and mixtures of butadiene-1,3 hydrocarbons with compounds which contain a single $CH_2$=C< group and are copolymerizable therewith, in the presence of .2 to 2 parts dry weight of hydrous silica sol per 100 parts of polymerizable material as a polymerization catalyst.

2. The process which comprises polymerizing in an aqueous emulsion at a pH from 2 to below 7 a mixture of a butadiene-1,3 hydrocarbon and a compound which contains a single $CH_2$=C< group and is copoylmerizable therewith in the presence of .2 to 2 parts dry weight of hydrous silica sol per 100 parts of polymerizable material as a polymerization catalyst.

3. The process which comprises polymerizing in an aqueous emulsion at a pH from 2 to below 7 a mixture of butadiene-1,3 and styrene in the presence of .2 to 2 parts dry weight of hydrous silica sol per 100 parts of polymerizable material as a polymerization catalyst.

4. In a process of polymerizing in aqueous emulsion material selected from the group consisting of butadiene-1,3 hydrocarbons and mixtures of butadiene-1,3 hydrocarbons with compounds which contain a single $CH_2$=C< group and are copolymerizable therewith, the step of carrying out the polymerization in non-alkaline medium in the presence of .2 to 2 parts dry weight of hydrous silica sol per 100 parts of polymerizable material as the sole added polymerization catalyst.

5. In a process of polymerizing in aqueous emulsion a mixture of butadiene-1,3 and styrene, the step of carrying out the polymerization in non-alkaline medium in the presence of .2 to 2 parts dry weight of hydrous silica sol per 100 parts of polymerizable material as the sole added polymerization catalyst.

6. The process which comprises polymerizing in an aqueous emulsion at a pH from 2 to below 7 material selected from the group consisting of butadiene-1,3 hydrocarbons and mixtures of butadiene-1,3 hydrocarbons with compounds which contain a single $CH_2$=C< group and are copolymerizable therewith, in the presence of .2 to 2 parts dry weight of hydrous silica sol per 100 parts of polymerizable material as the sole added polymerization catalyst.

7. The process which comprises polymerizing in an aqueous emulsion at a pH from 2 to below 7 a mixture of a butadiene-1,3 hydrocarbon and a compound which contains a single $CH_2$=C< group and is copolymerizable therewith in the presence of .2 to 2 parts dry weight of hydrous silica sol per 100 parts of polymerizable material as the sole added polymerization catalyst.

8. The process which comprises polymerizing in an aqueous emulsion at a pH from 2 to below 7 a mixture of butadiene-1,3 and styrene in the presence of .2 to 2 parts dry weight of hydrous silica sol per 100 parts of polymerizable material as the sole added polymerization catalyst.

ALFRED J. GREEN.

REFERENCES CITED

The following references are of record in the file of this patent:

UNITED STATES PATENTS

| Number | Name | Date |
| --- | --- | --- |
| 1,938,731 | Tschunkur | Dec. 12, 1933 |

FOREIGN PATENTS

| Number | Country | Date |
| --- | --- | --- |
| 315,916 | Great Britain | July 22, 1929 |
| 716,882 | France | Oct. 13, 1931 |